United States Patent [19]
Drexler

[11] Patent Number: 4,603,099
[45] Date of Patent: * Jul. 29, 1986

[54] METHOD FOR RECORDING MOTION PICTURE IMAGES AND LASER WRITTEN DATA

[75] Inventor: Jerome Drexler, Los Altos Hills, Calif.

[73] Assignee: Drexler Technology Corporation, Mountain View, Calif.

[*] Notice: The portion of the term of this patent subsequent to Mar. 5, 2002 has been disclaimed.

[21] Appl. No.: 692,789

[22] Filed: Jan. 17, 1985

Related U.S. Application Data

[63] Continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and Ser. No. 238,833, Feb. 27, 1981, abandoned.

[51] Int. Cl.⁴ .................................................. G03C 5/14
[52] U.S. Cl. ........................................ 430/140; 430/12; 430/945; 346/76 L; 346/1.1; 352/5; 352/44; 365/215; 369/273; 369/275
[58] Field of Search .................. 430/12, 15, 140, 945; 346/76 L, 135.1; 369/265, 273, 275; 365/215; 352/5, 38, 44

[56] References Cited

U.S. PATENT DOCUMENTS

| | | | |
|---|---|---|---|
| 3,932,032 | 1/1976 | Weinstein | 352/11 |
| 4,230,939 | 10/1980 | de Bont et al. | 235/488 |
| 4,278,756 | 7/1981 | Bouldin et al. | 430/414 |
| 4,312,938 | 1/1982 | Drexler et al. | 430/496 |
| 4,314,260 | 2/1982 | Drexler | 346/76 L |
| 4,343,879 | 8/1982 | Drexler et al. | 430/14 |
| 4,366,217 | 12/1982 | Bird et al. | 430/11 |
| 4,461,552 | 7/1984 | Levine | 352/77 |
| 4,503,135 | 3/1985 | Drexler | 430/12 |
| 4,572,891 | 2/1986 | Drexler | 430/346 |

FOREIGN PATENT DOCUMENTS 2036369A 12/1978 United Kingdom.
2044175A 10/1980 United Kingdom.

*Primary Examiner*—John E. Kittle
*Assistant Examiner*—José G. Dees

[57] ABSTRACT

A method for recording laser written information on motion picture film includes creating a visual image on the film photographically. A laser records sound information on a direct-read-after-write optical storage strip on an edge of the film. In one embodiment, the strip is made of reflective silver particles in a gelatin matrix. Different tracks may have different sound information such as foreign languages or stereophonic sound. Editing information is also writable on the strip.

6 Claims, 8 Drawing Figures

METHOD FOR RECORDING MOTION PICTURE IMAGES AND LASER WRITTEN DATA

CROSS REFERENCE TO RELATED APPLICATION

This is a continuation-in-part of patent application Ser. No. 443,596, filed Nov. 22, 1982, U.S. Pat. No. 4,503,135 which a continuation-in-part of patent application Ser. No. 238,832 filed Feb. 27, 1981, now U.S. Pat. No. 4,360,728, granted Nov. 23, 1982, and patent application Ser. No. 238,833, filed Feb. 27, 1981, abandoned.

TECHNICAL FIELD

The invention relates to optical data information storage and more particularly to a method for recording on an information medium with both motion picture images and laser recorded data, such as digitally recorded sound, editing data, or control signals.

BACKGROUND ART

In the past, the motion picture industry has employed sound track recording on a 0.1 inch wide strip of the 35 mm film carrying visual images. Sound is usually recorded on film by means of varying the exposure to light corresponding to sound vibrations. Synchronization of sound with pictures allows video images to be accompanied by analog data regarding the images. Foreign language films are usually provided with subtitles on the visual image to accompany the sound.

Weinstein teaches in U.S. Pat. No. 3,932,032 a system for digitally recording sound on motion picture film. In one embodiment a laser scanner enters a digital representation of the sound on the same frame as the corresponding picture. A projector capable of using this film employs a strip of photodetectors to recover the sound. LeVine in U.S. Pat. No. 4,461,552 uses pulse code modulation to sample sound. Digital codes are optically applied to the film sound track and optically detected when the film is played back through a projector. A modulated laser is used with a controllable refraction optical crystal or Bragg cell to scan the sound track for recording and reading. One problem is that the sound data must be developed along with the film. Until the film is developed there is no way to hear what was just recorded.

In the field of archival data storage, it is frequently necessary to store audio-visual information. Adding digital information by means of a small laser recorder could be of considerable value for stored motion picture film. Such add-on records have a potential of getting separated from the recorded film during storage in archives. Even if not separated, the differences in archival storage properties, say between film and paper, pose storage problems.

An object of the invention is to provide a method for digital recording of sound or of editing information along with motion picture film.

A further object of the invention is to provide this method where the sound may be immediately played back for review.

A further object of the invention is to provide control signals synchronized with the film which can be used to control other audiovisual devices in synchronism with the film.

DISCLOSURE OF THE INVENTION

The above objects have been met with a photosensitive film having, on at least one edge, a strip of laser recordable material. The film could be either unexposed or exposed film in a format for motion picture use. A laser beam records data on the strip of recordable material either by ablation, melting, chemical change or by deformation forming spots thereby producing differences in reflectivity detectable by a light detector. In this manner, data concerning the visual image, such as sound and editing information, may be recorded and read directly from the strip. Interpretative data may be integrated with the picture record and both stored together. Separate tracks of the strip may have different languages, stereophonic sound, editing information recorded, or control signals for other audiovisual devices on it. The data strip may contain prerecorded data, concurrently recorded data or data recorded after exposure of the photosensitive film portion of the medium. The film may have the data strip produced with the film or made separately and attached separately at a later time.

No processing after laser recording is required for the recording strip when it is a direct-read-afterwrite material. Laser recording materials also may be used that require heat processing after laser recording. The uniform surface reflectivity of this strip before recording typically would range between 8% and 65%. For a highly reflective strip the average reflectivity over a laser recorded spot might be in the range of 5% to 25%. Thus, the reflective contrast ratio of the recorded holes would range between 2:1 and 7:1.

Laser recording materials can also be used which have low reflectivity and the laser creates spots of high reflectivity. An example of this type of material is described in U.S. Pat. No. 4,343,879. When the reflectivity of the field is in the range of 8% to 20%, the reflective spots have a reflectivity of 40%. The reflective contrast ratio would range from 2:1 to 5:1. Photographic pre-formatting would create spots having a 10% reflectivity in a high reflective field or 50% in a low reflectivity field. Processing of the exposed silver-halide emulsion does not affect the recordability of the reflective strip.

An advantage of the invention is that laser recorded data need not be developed before it can be read. Sound and editing information is immediately available.

BEST MODE FOR CARRING OUT THE INVENTION

Figure 1:
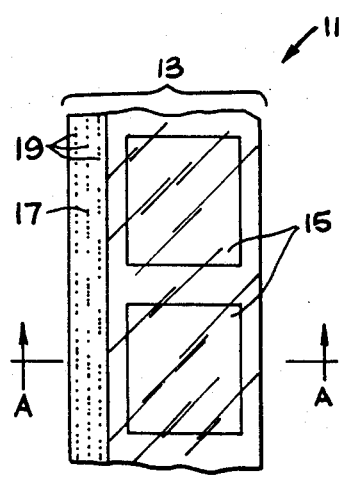
FIG. 1 is a top view of a first embodiment of the recording medium of the present invention.

With reference to FIG. 1, the recording medium of the present invention may be seen to comprise a photographic medium 11 having a planar major surface 13 which is divided into a photographic image area 15 and a data strip 17. Photographic medium 11 is preferably single film in roll form, for example motion picture film. The photographic image areas 15 are conventional photographic images, produced by usual photographic techniques, typically by exposure and development of the film. The image areas 15 may occupy the entirety of the film, except for the data strip, or discrete areas as shown in FIG. 1. The discrete areas may resemble motion picture film or roll film where several images are disposed on a unitary film member. Alternatively, only a single image may be on the film.

The present invention features an optical data strip 17 which is a direct-read-after-write (DRAW) material which may have either prerecorded information or user-written information, or both. The type of DRAW material used can be relatively highly reflective material which forms a shiny field against low reflectivity spots such as craters, holes or dark spots in the reflective surface which tend to be absorptive of light energy. The contrast differences between the low reflectivity spots and the shiny reflective field surrounding the spots cause variations at a detector when the spots are illuminated by light of lesser intensity than the light that originally created the spots.

Data strip 17 is intended to provide a sound data record accompanying the photographic images on the same material in the same way that a conventional movie sound track accompanies individual frames of film. Editing information, control programs, and film exposure data may also be recorded. Data is written in individual tracks extending in a longitudinal direction, as indicated by the spot patterns 19 and these spot patterns are analogous to conventional sound track on a film, except that the data tracks contain a much higher density of information and are usually read in reflection, rather than in transmission. Different tracks may be used to record the sound track in different languages, or create stereophonic sound. The information density is greater because each of the spots in the spot pattern is approximately 5 microns in diameter with a spacing of about 5–10 microns between spots. The spots may be either digital or analog data, but in either case are recorded by a laser in the usual way, for example as shown in U.S. Pat. No. 4,278,756 to Bouldin, et al.

Figure 2:
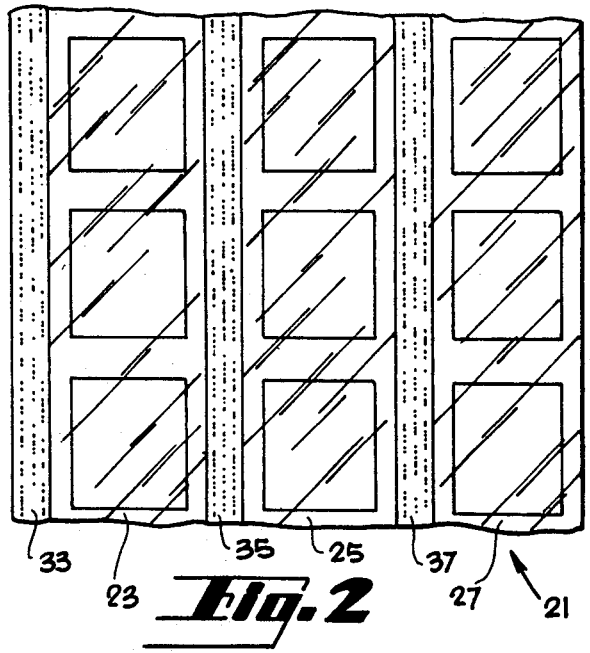
FIG. 2 is a top view of the second embodiment of the present invention.

FIG. 2 is similar to FIG. 1 except that a larger photographic medium 21 is used with a plurality of rows of images 23, 25 and 27. Accompanying each row of images is a corresponding data strip 33, 35 and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips may not be read with the naked eye, but require either microscopic inspection or preferably reading by reflection of a scanning laser beam as explained below.

Figure 3:
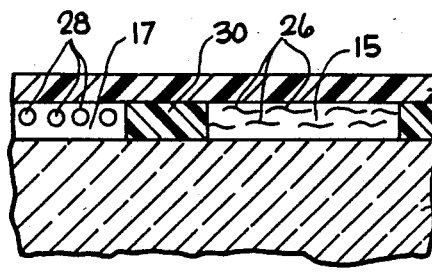
FIGS. 3–6 are alternate sectional constructions of the medium of FIG. 1 taken along lines 1—1 in FIG. 1.

FIG. 3 illustrates a first construction of the recording medium shown in FIG. 1. The sectional view includes a substrate 33 which is transparent and may be one of the many polymeric substrate materials known in photographic arts. Applied to the substrate 22 is a subbing layer, not shown, and an emulsion layer 24. This emulsion layer has a photographic image area 15 made by exposure and development in the usual way. The wavy lines 26 represent filamentary black silver particles which characterize normal photographic black and clear images. Data strip 17 is one of many laser recording materials, for example, it could be made from silver-halide emulsion having fine grain size, less than 0.1 microns, by a silver diffusion transfer process described in U.S. Pat. No. 4,312,938 (Drexler and Bouldin), incorporated by reference herein.

In the referenced patented process, silver-halide emulsion is exposed to a non-saturating level of actinic radiation to activate silver halide. The activated emulsion is then photographically developed to a gray color of an optical density of 0.05–2.0 to red light, forming an absorptive underlayer. There is no fixing after this first development step. The surface of the emulsion strip is then fogged by a fogging agent such as borohydride to produce silver precipitating nuclei from the part of the unexposed and undeveloped silver-halide emulsion. The strip is then contacted with a monobath containing a silver-halide solvent and a silver reducing agent to complex, transfer and reduce the remaining unexposed and undeveloped silver to reflective non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Separating the data strip from the image area is an unprocessed silver-halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in photolithography. However, in the present case it may be necessary to proceed in two steps. In the first step, conventional photographic processing of image area 26 takes place. Subsequently, the image area, together with the buffer area 30 is masked to allow separate processing of the data strip 28. After processing is complete, a transparent layer 32 is applied to the emulsion, forming a protective layer. Layer 32 may be any of the well-known protective coatings, including a layer of clear gelatin. The remainder of the film, apart from the data strip 17, need not have fine grain size. Data strip 17 can also be added to the photographic film in the form of an adhesive tape which is bonded to the photographic film either before or after the film is developed.

Figure 4:
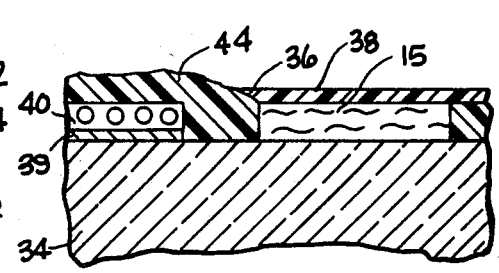

FIG. 4 is similar to FIG. 3 except that substrate 34 is coated only with silver-halide emulsion to the right of line 36. The image area 15 is exposed, developed and fixed. A protective coating 38 may then be applied. A preformed strip 40 of laser recording material may then be disposed on the substrate. This may be a strip of Drexon material. Drexon is a trademark of Drexler Technology Corporation for reflective silver based laser recording material, such as that described in the aforementioned U.S. Pat. No. 4,312,938. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to DeBont, et al. where the patent teaches a thin metallic recording layer of reflective metal such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. These materials may be deposited directly on substrate 34, as by sputtering, or may be premanufactured on a very thin substrate and adhered to the substrate by means of a subbing layer. After adhering the laser recording material to the substrate, a transparent protective coating 44 is applied. This coating material may be the same as protective material 38.

Figure 5:
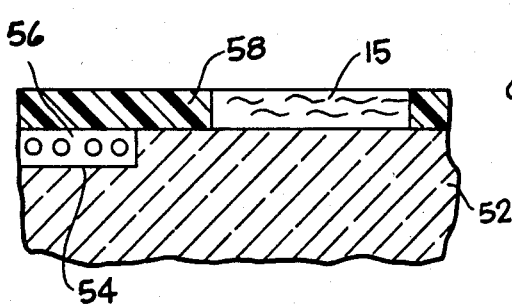

With reference to FIG. 5, substrate 52 has a notch or groove 54 which allows placement of a laser recording material 56 therein. This laser recording material may be processed in situ from silver-halide material previously existing in the groove, as in the case of FIG. 3, or preexisting laser recording material which is placed in the groove, as with the preexisting laser recording material of FIG. 4. In either case, the photographic image area 15 is exposed and developed in the usual way, while an unexposed and undeveloped area 58 protects data strip 56. Since emulsion area 58 is unexposed and undeveloped, it remains clear and forms a protective layer over the data strip.

Figure 6:
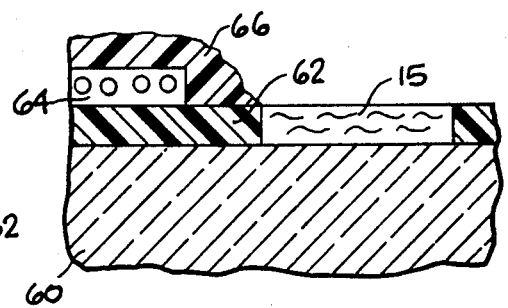

In the embodiment of FIG. 6, no groove exists in substrate 60. Rather, a photographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver-halide emulsion strip which is then processed, as data strip 17 in FIG. 3 is processed, or may be a preformed strip which is applied as in FIG. 4. The strip is then covered with a protective coating 66.

Figure 7:
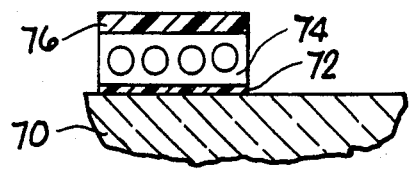
FIG. 7 is a partial sectional view of an alternate embodiment of the medium of FIG. 1.

With reference to FIG. 7, a substrate 70 is shown which carries a photographic image in a substrate portion not shown. This image may be above the substrate surface or within a groove of the substrate, as previously mentioned. The substrate carries a secondary substrate 72 which is a thin flexible material, only a few mils thick carrying laser recording material 74. The secondary substrate 72 is adhered to the primary substrate 70 by means of an adhesive or sticky substance, similar to dry adhesives found on tape. The laser recording material may be any of the materials previously discussed, such as Drexon material, except that the secondary substrate 72 is substituted for the substrate previously mentioned. A protective coating 76 is applied over the laser recording material. Using this embodiment, photographs of the prior art may be converted to the optical data and image medium of the present invention. In this situation, not shown in the drawing of FIG. 7, a portion of an image area is converted to a nonimage area by application of the sticky laser recording material. The laser recording material rests above developed silver-halide emulsion, resembling FIG. 6, except that the emulsion is completely exposed and developed in the region underlying the secondary substrate.

In all of these embodiments, a strip of laser recording material is positioned adjacent one or more photographic images for providing archival data storage of a similar quality for data as for the photo image. Editing remarks or film exposure measurement, in the form of alphanumerics, voice, or digitized pictures may be recorded adjacent to the photographic image. By this means these two forms of communication will not be separated. This arrangement is of particular value to add analytical information for control of film development, or for better communication between separate sound and picture editing crews.

Figure 8:
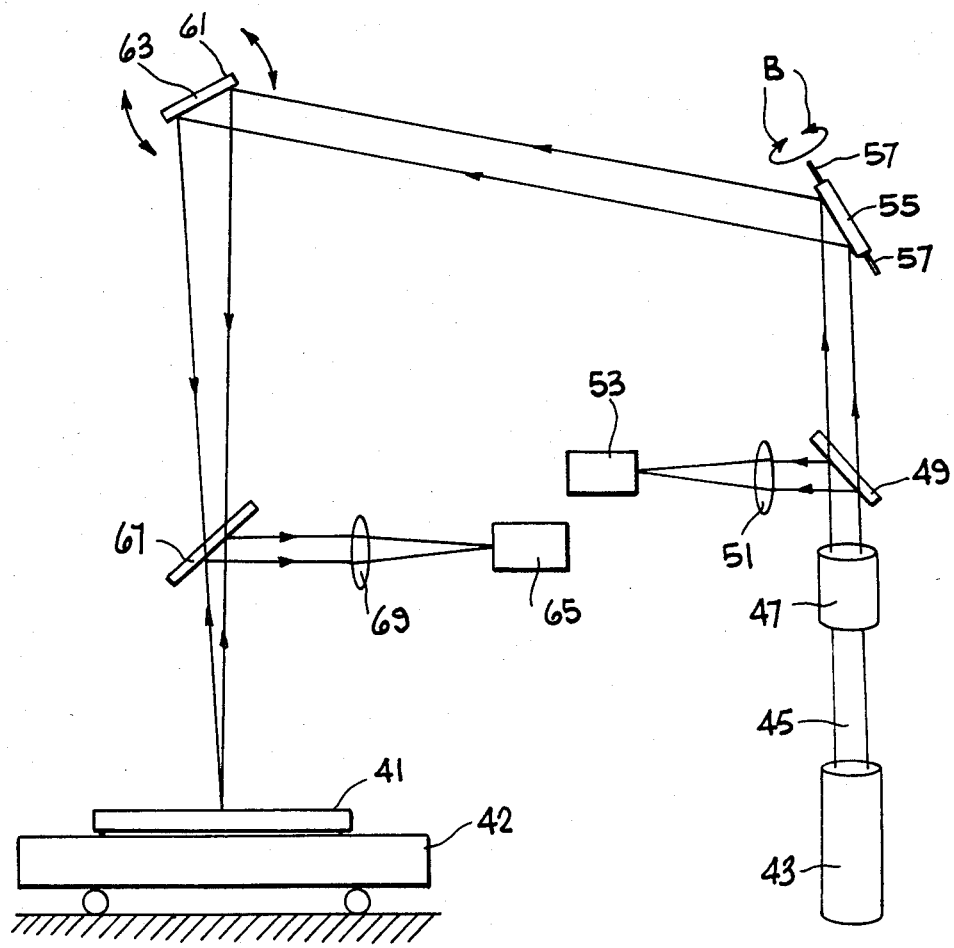
FIG. 8 is a plan view of optical apparatus for reading and writing on the data strip portion of the medium illustrated in FIG. 1.

Of course, while the photo images may be read by conventional means, low-powered laser or a photodetector array apparatus must be used to read the data strip. A laser apparatus is illustrated in FIG. 8, which illustrates the side view of the lengthwise dimension of the medium of FIG. 1 consisting of a data strip in combination with photo images. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then direcred to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor adjusted by a closed loop position servo system of the type used in magnetic disk drives. Reference position information may be prerecorded on the card so that position error signals may be generated and used as feedback in motor control. Control signals for other synchronized audiovisual devices may also be prerecorded or may be recorded later. Upon reading one data path, the mirror 55 is slightly rotated. The motor moves holder 42 lengthwise so that the path can be read again, and so on. As light is scattered and reflected from spots in the laser recording material, the reflectivity of the beam changes relative to surrounding material where no spots exist. The beam should deliver sufficient laser energy to the surface of the recording material to create pits in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a spot and surrounding material are detected by light detector 65 which may be a photodiode. Light is focused onto detector 65 by beam splitter 67 and focusing lens 69. Servo motors, not shown, control the poisitions of the mirrors and drive the mirrors in accord with instructions received from control circuits, as well as fom feedback devices. The detector 65 produces electrical signals corresponding to pits. Other optics, not shown, could be used to observe the photo iamges, while data is being read or written on the data strip.

A photodetector array such as a CCD could also be used. It could be either a linear array or area array. The number of detector elements per track would be approximately three elements to create a reading redundancy. The surface would be illuminated with low-cost light-emitting diodes generating power primarily in the near infrared to match the sensitivity spectrum of the photodetector array.

I claim:

1. A method for recording motion pictures comprising, creating a motion picture on a web of photosensitive film, disposing a web of a laser direct-read-after-write optical storage medium in side-by-side relationship with said motion picture, and recording information related to said motion picture onto said laser storage medium.

2. The method of claim 1 wherein recording said information comprises recording a motion picture sound track.

3. The method of claim 1 wherein recording said information comprises recording a plurality of motion picture sound tracks, each sound track in a different language.

4. The method of claim 1 wherein recording said information comprises recording editing information.

5. The method of claim 1 wherein recording said information comprises recording projection control information.

6. The method of claim 1 wherein recording said information comprises recording control signals for other synchronized audiovisual devices.

* * * * *